(12) United States Patent
Wu et al.

(10) Patent No.: US 11,279,350 B2
(45) Date of Patent: Mar. 22, 2022

(54) METHOD OF ADAPTIVE TRAJECTORY GENERATION FOR A VEHICLE

(71) Applicant: Automotive Research & Testing Center, Lugong (TW)

(72) Inventors: Chien-Feng Wu, Lugong (TW);
Bo-Han Lin, Lugong (TW);
Tsung-Ming Hsu, Lugong (TW);
Ming-Kuan Ko, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 286 days.

(21) Appl. No.: 16/728,901

(22) Filed: Dec. 27, 2019

(65) Prior Publication Data

US 2021/0197804 A1 Jul. 1, 2021

(51) Int. Cl.
*B60W 30/09* (2012.01)
*B60W 50/00* (2006.01)
*G08G 1/16* (2006.01)
*B60W 30/095* (2012.01)

(52) U.S. Cl.
CPC ........ *B60W 30/09* (2013.01); *B60W 30/0956* (2013.01); *B60W 50/00* (2013.01); *G08G 1/16* (2013.01); *B60W 2050/0019* (2013.01); *B60W 2520/06* (2013.01); *B60W 2520/10* (2013.01); *B60W 2520/105* (2013.01); *B60W 2552/00* (2020.02); *B60W 2554/4041* (2020.02); *B60W 2554/4042* (2020.02); *B60W 2555/60* (2020.02); *B60W 2710/18* (2013.01)

(58) Field of Classification Search
CPC ............... B60W 30/09; B60W 30/095; B60W 30/0956; B60W 50/00; B60W 2050/0019; B60W 2520/06; B60W 2520/10; B60W 2520/105; B60W 2552/00; B60W 2554/4041; B60W 2554/4042; B60W 2555/60; B60W 2710/18; G08G 1/16
See application file for complete search history.

(56) References Cited

U.S. PATENT DOCUMENTS

| | | | |
|---|---|---|---|
| 7,607,741 B2 * | 10/2009 | Seto | B60T 7/22 303/193 |
| 9,517,755 B1 * | 12/2016 | Chen | B60T 7/22 |
| 9,718,466 B2 | 8/2017 | Kim et al. | |
| 2019/0180629 A1 * | 6/2019 | Kim | G08G 1/096725 |
| 2019/0276013 A1 * | 9/2019 | Kim | B60W 50/0097 |
| 2019/0329762 A1 * | 10/2019 | Kwon | B60T 8/17558 |
| 2020/0384964 A1 * | 12/2020 | Lewandowski | B60T 7/22 |
| 2021/0101589 A1 * | 4/2021 | Jeon | B62D 15/0255 |

FOREIGN PATENT DOCUMENTS

| | | |
|---|---|---|
| CN | 106114507 A | 11/2016 |
| CN | 107813820 A | 3/2018 |

* cited by examiner

*Primary Examiner* — Anshul Sood
(74) *Attorney, Agent, or Firm* — Michael Best & Friedrich LLP

(57) ABSTRACT

A method of adaptive trajectory generation for a vehicle is provided. A computer device of the vehicle may update a current trajectory for the vehicle when some predetermined conditions that are related to an obstacle positioned within a predetermined distance of the vehicle are satisfied.

16 Claims, 5 Drawing Sheets

METHOD OF ADAPTIVE TRAJECTORY GENERATION FOR A VEHICLE

FIELD

The disclosure relates to a method of trajectory generation, and more particularly to a method of adaptive trajectory generation.

BACKGROUND

Autonomous driving involves environment sensing, navigation, trajectory planning, and decision control. Among them, trajectory planning is a technique to find, for a vehicle in an environment that has one or more obstacles, a collision-free path from a starting point to a target point based on certain evaluation criteria associated with, for example, vehicle attitude, vehicle velocity, and environmental condition, so that the vehicle can safely and smoothly run on the path thus found.

However, conventional autonomous driving techniques are not capable of changing the planned trajectory when an unexpected event occurs on the road. For example, when an obstacle suddenly and unexpectedly appears on the road, the conventional autonomous driving techniques usually cause the vehicle to brake instead of changing its trajectory even if there is time to dodge the obstacle, thereby not being able to get the vehicle out of harm's way.

SUMMARY

Therefore, an object of the disclosure is to provide a method of adaptive trajectory generation for a host vehicle. The method can alleviate at least one of the drawbacks of the prior art.

According to the disclosure, the host vehicle includes a vehicle sensor device, an obstacle sensor device, a navigation device, a traffic flow sensor device and a computer device. The vehicle sensor device is configured to continuously detect vehicle dynamic parameters of the host vehicle, so as to generate vehicle information that relates to the host vehicle and that includes a vehicle velocity and a vehicle acceleration. The vehicle velocity refers to a velocity of the host vehicle, and the vehicle acceleration refers to an acceleration of the host vehicle. The obstacle sensor device is configured to continuously perform obstacle detection within a predetermined distance of the host vehicle, and to generate, for each obstacle thus detected, an obstacle information piece corresponding to the obstacle. The obstacle information piece includes an obstacle location, an obstacle velocity, and an obstacle acceleration. The navigation device stores a map that relates to a route on which the host vehicle is traveling, and is configured to continuously determine a vehicle location which refers to a location of the host vehicle, and to generate road condition information that includes a maximum speed limit and a lane width of a current lane, which is a lane in which the host vehicle is currently located. The map includes information of each lane of each road. The traffic flow sensor device is configured to detect velocities of vehicles in an adjacent lane that is a lane next to the current lane and that has a same lane direction as the current lane. The computer device is coupled to the vehicle sensor device, the obstacle sensor device, the navigation device and the traffic flow sensor device, and stores a current trajectory for the host vehicle. The method is implemented by the computer device, and includes, for a detected obstacle, which is an obstacle detected by said obstacle sensor device within the predetermined distance of the host vehicle: A) determining whether a first predetermined condition is satisfied at a current time point, wherein the first predetermined condition is related to the vehicle information, the vehicle location and the obstacle information piece generated for the detected obstacle; B) upon determining that the first predetermined condition is not satisfied, determining whether a second predetermined condition is satisfied at the current time point, wherein the second predetermined condition is related to the vehicle information, the vehicle location, the obstacle information piece generated for the detected obstacle, the road condition information and the velocities of vehicles in the adjacent lane; and C) upon determining that the second predetermined condition is satisfied, updating the current trajectory based on the vehicle information, the vehicle location, the obstacle information piece generated for the detected obstacle, and the road condition information that correspond to the current time point.

Another object of the disclosure is to provide a system for adaptive trajectory generation for a host vehicle. The system includes a vehicle sensor device, an obstacle sensor device, a navigation device, a traffic flow sensor device and a computer device. The vehicle sensor device is configured to continuously detect vehicle dynamic parameters of the host vehicle, so as to generate vehicle information that relates to the host vehicle and that includes a vehicle velocity and a vehicle acceleration. The vehicle velocity refers to a velocity of the host vehicle, and the vehicle acceleration refers to an acceleration of the host vehicle. The obstacle sensor device is configured to continuously perform obstacle detection within a predetermined distance of the host vehicle, and to generate, for each obstacle thus detected, an obstacle information piece corresponding to the obstacle. The obstacle information piece includes an obstacle location, an obstacle velocity that refers to a velocity of the obstacle, and an obstacle acceleration that refers to an acceleration of the obstacle. The navigation device stores a map that relates to a route on which the host vehicle is traveling, and is configured to continuously determine a vehicle location which refers to a location of the host vehicle, and to generate road condition information that includes a maximum speed limit and a lane width of a current lane, which is a lane in which the host vehicle is currently located. The map includes information of each lane of each road. The traffic flow sensor device is configured to detect velocities of vehicles in an adjacent lane that is a lane next to the current lane and that has a same lane direction as the current lane. The computer device is coupled to the vehicle sensor device, the obstacle sensor device, the navigation device and the traffic flow sensor device, and stores a current trajectory for the host vehicle. The computer device is configured to, for a detected obstacle, which is an obstacle detected by said obstacle sensor device within the predetermined distance of the host vehicle, determine whether a first predetermined condition is satisfied at a current time point. The first predetermined condition is related to the vehicle information, the vehicle location and the obstacle information piece generated for the detected obstacle. The computer device is configured to, upon determining that the first predetermined condition is not satisfied, determine whether a second predetermined condition is satisfied at the current time point. The second predetermined condition is related to the vehicle information, the vehicle location, the obstacle information piece generated for the detected obstacle, the road condition information and the velocities of vehicles in the adjacent lane. The computer device is configured to, upon determining that the second predetermined condition is satisfied, update the current trajectory based on the vehicle information, the vehicle location, the obstacle information piece generated for the detected obstacle, and the road condition information that correspond to the current time point.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
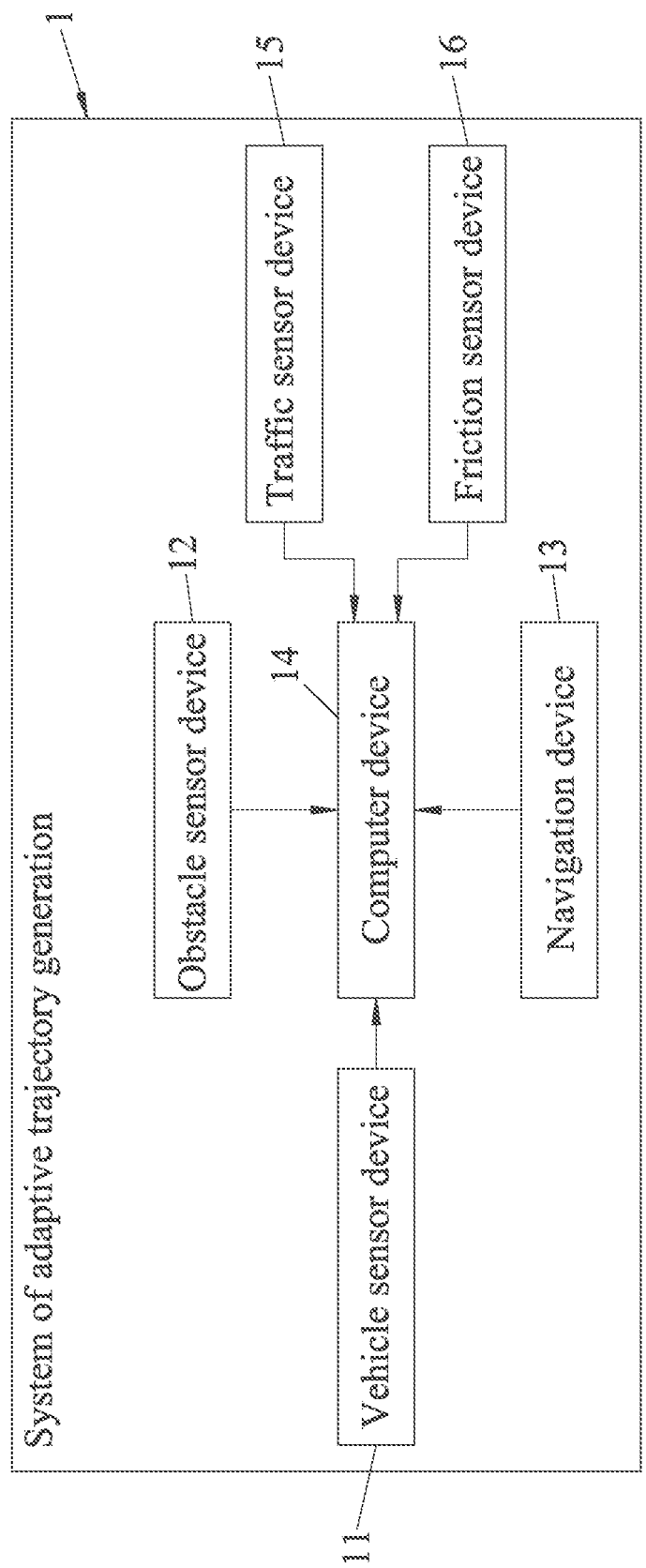
FIG. 1 is a block diagram illustrating an embodiment of a system of adaptive trajectory generation according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates an embodiment of a system 1 of adaptive trajectory generation according to this disclosure. The system 1 is installed on a host vehicle (not shown), and includes a vehicle sensor device 11, an obstacle sensor device 12, a navigation device 13, a computer device 14, a traffic flow sensor device 15, and a friction evaluation device 16.

The vehicle sensor device 11 is configured to continuously detect vehicle dynamic parameters of the host vehicle, so as to generate vehicle information that relates to the host vehicle. The vehicle information may include but not limited to, a velocity of the host vehicle (referred to as vehicle velocity hereinafter), an acceleration of the host vehicle (referred to as vehicle acceleration hereinafter), and a heading angle of the host vehicle. In this embodiment, the vehicle sensor device 11 may include but not limited to a gyroscope, an odometer, a speed meter, an inertial measurement unit (IMU), and/or the lie.

The obstacle sensor device 12 is configured to continuously perform obstacle detection within a predetermined distance $D_{max}$ of the host vehicle, so as to generate, for each obstacle detected, an obstacle information piece corresponding to the obstacle. The obstacle information piece includes, for the corresponding obstacle, a distance of the obstacle from the host vehicle in a front-back direction of (or defined by) the host vehicle (e.g., a front distance of a front obstacle relative to the host vehicle, which is defined as a distance from the host vehicle to the front obstacle in the front-back direction), a velocity of the obstacle in the front-back direction relative to the host vehicle (e.g., a forward velocity of the obstacle relative to the host vehicle), and an acceleration of the obstacle in the front-back direction relative to the host vehicle (e.g., a forward acceleration of the obstacle relative to the host vehicle), a location of the obstacle (referred to as obstacle location hereinafter), a velocity of the obstacle (referred to as obstacle velocity hereinafter), an acceleration of the obstacle (referred to as obstacle acceleration hereinafter), and a length of the obstacle in the front-back direction (referred to as obstacle length hereinafter). In this embodiment, the obstacle sensor device may include but not limited to a lidar, a supersonic wave radar, a millimeter wave radar, a camera, and/or the like.

The navigation device 13 stores a map that relates to a route on which the host vehicle is traveling. The map includes information of each lane of each road. The navigation device 13 is configured to continuously determine a location of the host vehicle (referred to as vehicle location hereinafter), and to generate road condition information that includes a maximum speed limit and a lane width of a current lane, which is a lane in which the host vehicle is currently located. In this embodiment, the navigation device 13 may include but not limited to a global positioning system (GPS).

The traffic flow sensor device 15 is configured to detect velocities of vehicles in each adjacent lane, where an adjacent lane is defined as a lane next to the current lane and having a same lane direction (designated traffic direction for the lane) as the current lane, and to obtain a traffic flow for each adjacent lane by, for example, averaging the velocities of the vehicles in the adjacent lane. In this embodiment, the traffic flow sensor device 15 may include but not limited to a lidar, a supersonic wave radar, a millimeter wave radar, a camera, and/or the like.

The friction evaluation device 1 may be a friction meter configured to measure a friction coefficient of the current lane, and to evaluate friction between the host vehicle and the current lane.

The computer device (e.g., a car computer) is electrically coupled to the vehicle sensor device 11, the obstacle sensor device 12, the navigation device 13, the traffic flow sensor device 15 and the friction evaluation device 16 for receiving sensing results from them, and stores therein a current trajectory for the host vehicle.

Figure 2:
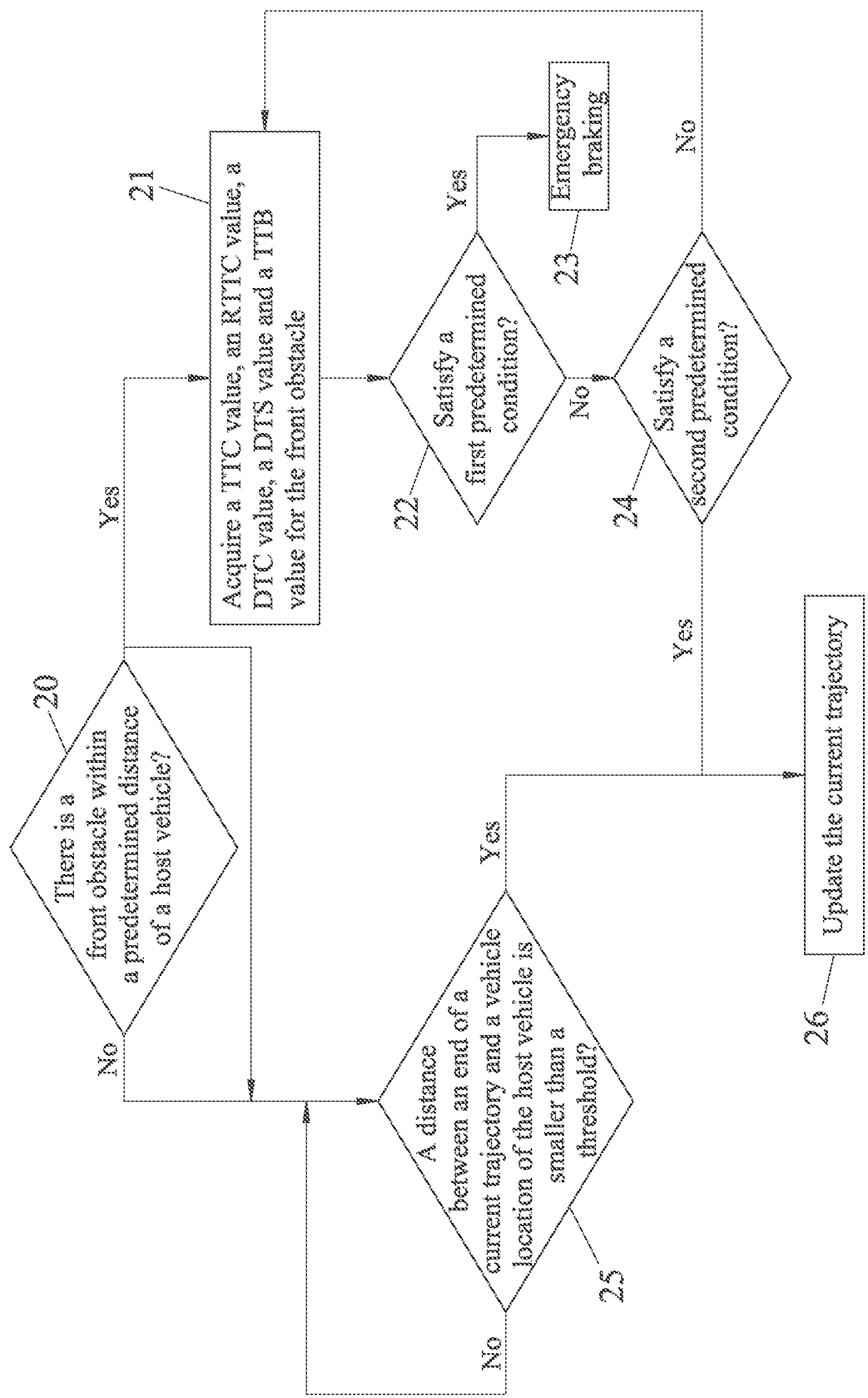
FIG. 2 is a flow chart illustrating steps of an embodiment of a method of adaptive trajectory generation according to the disclosure.

Further referring to FIG. 2, an embodiment of a method to be implemented by the system 1 for adaptive trajectory generation for the host vehicle is illustrated.

In step 20, the computer device 14 determines whether there is a front obstacle within the predetermined distance $D_{max}$ of the host vehicle, where a front obstacle is defined as an obstacle in front of the host vehicle and located in the current lane. The flow goes to step 21 when the computer device 14 determines that there is a front obstacle within the predetermined distance $D_{max}$ of the host vehicle, and goes to step 25 when otherwise. In detail, the computer device 14 first determines whether there is an obstacle within the predetermined distance $D_{max}$ of the host vehicle based on the sensing results from the obstacle sensor device 12. If the determination is affirmative, the computer device 14 further determines, for each obstacle information piece generated by the obstacle sensor device 12, whether the obstacle is a front obstacle in front of the host vehicle in the current lane based on the obstacle location of the obstacle information piece. On the other hand, when there are no obstacles within the predetermined distance $D_{max}$ of the host vehicle, the flow goes to step 25. The flow also goes to step 25 when the computer device 14 determines that there is a front obstacle (i.e., both steps 21 and 25 are performed when the determination result of step 20 is in the affirmative), but does not go to step 21 and only goes to step 25 when the determination result of step 20 is in the negative. For the scenario where the determination made in step 2C, is in the affirmative, the steps to follow will be performed with respect to a single front obstacle.

In step 21, the computer device 14 acquires a TTC value, an RTTC value, a DTC value, a DTB value and a TTB value for the front obstacle at a current time point. A TTC (time to collision) value is acquired based on the front distance, the forward velocity and the forward acceleration at the corresponding time point, and indicates a length of time after which the host vehicle will collide with the front obstacle. An RTTC (rate of change in TTC) value is acquired based on the TTC value acquired for the current time point and a TTC value acquired for a last time point before the current time point, and indicates a rate of change in the TTC value. A DTC (distance to collision) value is acquired based on the vehicle location and the obstacle location at the corresponding time point, and indicates a distance between the host vehicle and the front obstacle. A DTC (distance to brake) value is a threshold value acquired based on the vehicle velocity and the obstacle velocity at the corresponding time point, and indicates a distance required for a safe stop of the host vehicle if the computer device 14 decides to brake. In this embodiment, a DTB value is calculated to be equal to:

$$|(v_{host} - v_{obstacle})|Tr + \frac{v_{host}^2 - v_{obstacle}^2}{2\mu g} + d_{min},$$

where $v_{host}$ represents the vehicle velocity (usually in units of m/s), $v_{obstacle}$ represents the obstacle velocity (usually in units of m/s), Tr represents a predefined brake reaction time (usually in units of second), $\mu$ represents the friction coefficient of the current lane sensed by the friction evaluation device 16, g represents a gravity acceleration (9.8 m/s$^2$), and $d_{min}$ represents a predefined minimum safe distance after braking (usually in units of meter). A TTB (time to brake) value is acquired based on the vehicle velocity at the corresponding time point, and indicates a length of time required for a safe stop of the host vehicle from a beginning of braking of the host vehicle.

In step 22, the computer device 14 determines whether a first predetermined condition is satisfied with respect to the front obstacle at the current time point based on the TTC value, the RTTC value, the DTC value, the DTB value and the TTB value acquired for the current time point. In this embodiment, the first predetermined condition is exemplified to include that the DTC value is smaller than or equal to the DTB value, that the TTC value is smaller than or equal to the TTB value, and that the RTTC value is smaller than zero (i.e., is negative). The flow goes to step 23 when the first predetermined condition is satisfied, and goes to step 24 when otherwise.

In step 23, the computer device 14 performs an algorithm of autonomous emergency braking (AEB) in order to control the host vehicle to perform emergency braking.

In step 24, the computer device 14 determines whether a second predetermined condition is satisfied with respect to the front obstacle based on the maximum speed limit of the current lane at the current time point, the vehicle velocity at the current time point, the velocities of the vehicles in each adjacent lane at the current time point, and the RTTC value acquired for the current time point. In this embodiment, the second predetermined condition is exemplified to include that the maximum speed limit is greater than the vehicle velocity by a first predetermined value (e.g., 20 km/hr) at the current time point, that the traffic flow of the vehicles e.g., the average of the velocities of the vehicles in this embodiment) in each adjacent lane is smaller than the maximum speed limit by a second predetermined value (e.g., 5 km/hr), and that the RTTC value is smaller than zero. The flow goes to step 26 when the second predetermined condition is satisfied, and goes back to step 21 when otherwise.

In step 25, the computer device 14 determines whether a distance at the current time point between the vehicle location and an end of the current trajectory is smaller than a threshold. In this embodiment, the threshold is related to the vehicle velocity, and is exemplified as $[(v_{host}/3.6) \times 2]$ meters, where $v_{host}$ represents the vehicle velocity (usually in units of m/s), and "2" is a predetermined parameter of time (usually in units of second). The flow goes to step 26 when the distance between the vehicle location and the end of the current trajectory at the current time point is smaller than the threshold, and goes back to step 25 when otherwise.

It is noted that, when the computer device 14 determines that there is a front obstacle within the predetermined distance $D_{max}$ of the host vehicle in step 20, steps 20-24 and step 25 may be performed independently, but this disclosure is not limited in this respect.

In step 26, the computer device 14 updates the current trajectory based on the vehicle information, the vehicle location, the obstacle information piece (s) of each obstacle detected by the obstacle sensor device 12, the road condition information, and the DTC, TTC, RTTC and DTB values of the front obstacle, all of which correspond to the current time point.

Figure 3:
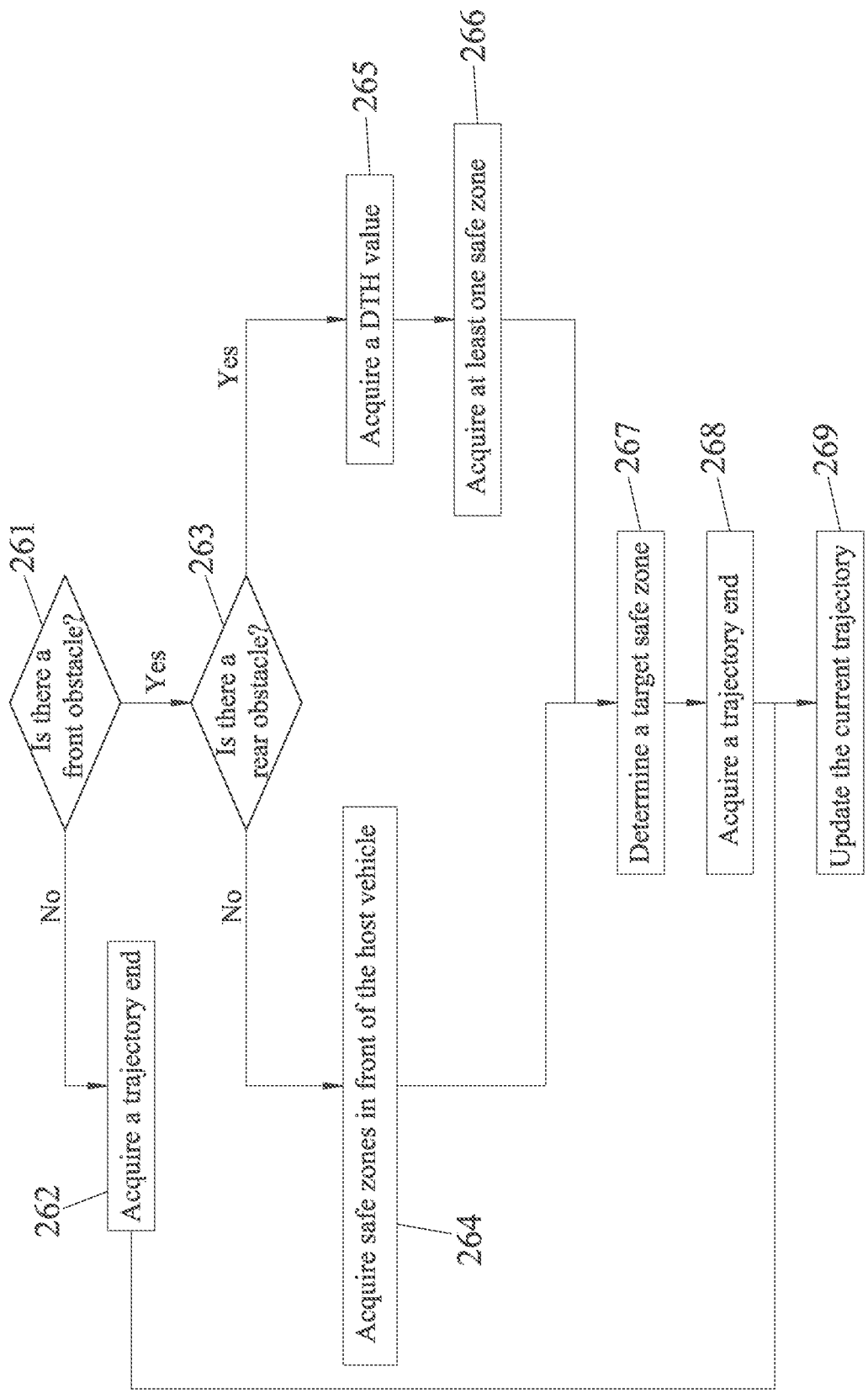
FIG. 3 is a flow chart illustrating sub-steps of step 26 in FIG. 2.

Further referring to FIG. 3, step 26 includes sub-steps 261-269 in this embodiment.

In sub-step 261, the computer device 14 determines whether there is a front obstacle within the predetermined distance $D_{max}$ of the host vehicle. For details of the determination, reference may be made to the determination made in step 20. The flow goes to sub-step 262 when there is no front obstacle within the predetermined distance $D_{max}$ of the host vehicle, and goes to sub-step 263 when otherwise.

In sub-step 262, the computer device 14 acquires a trajectory end. In this embodiment, the trajectory end is exemplified as a position in front of the host vehicle by a maximum estimated distance $L_{max}$, where $D_{max} \geq L_{max}$, and the maximum estimated distance $L_{max}$ is exemplified to be equal to $[v_{host}/2) \times Time_{system}]$, where $v_{host}$ represents the vehicle velocity (usually in units of m/s), and $Time_{system}$ is a parameter of time, which may range, for example, between 4 seconds and 6 seconds.

In sub-step 263, the computer device 14 determines whether there is a rear obstacle at the current time point based on the obstacle location of each obstacle information piece generated by the obstacle sensor device 12 for the current time point, where the rear obstacle refers an obstacle that is detected by the obstacle sensor device 12 and that is behind the host vehicle and located in the adjacent lane. The flow goes to sub-step 264 when there is no rear obstacle, and goes to sub-step 265 when otherwise.

In sub-step 264, the computer device 14 acquires multiple safe zones in front of the host vehicle based on the DTC value of the front obstacle, the vehicle velocity that corresponds to the current time point, and the lane width of the current lane.

Figure 4:
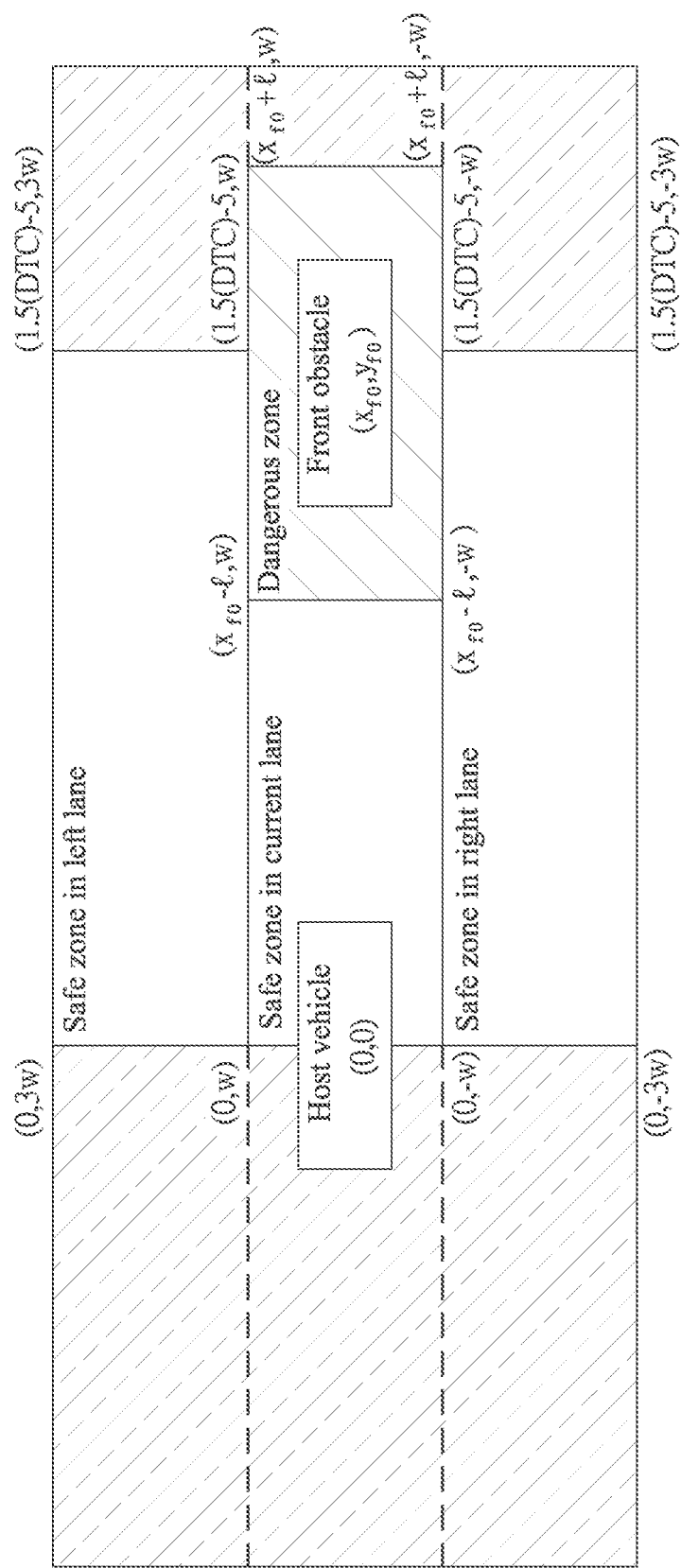
FIG. 4 is a schematic diagram illustrating safety zones acquired using the embodiment when there is no rear obstacle.

In this embodiment, the computer device 14 first acquires a dangerous zone, in which the front obstacle is located, based on the DTC value of the front obstacle and the vehicle velocity at the current time point, and on the lane width of the current lane. Then, the computer device 14 acquires a safe zone in the current lane based on the dangerous zone, and a safe zone in each adjacent lane (e.g., a left lane or a right lane next to the current lane). Referring to FIG. 4, if a center of the host vehicle is at (0, 0), a center of the front obstacle is at ($x_{fo}$, $y_{fo}$), and the dangerous zone is a rectangular zone having a length of 2l and a width of 2w, where l represent a length of the front obstacle in the front-back direction, and 2w is the lane width of the current lane, the safe zone in the current lane can be represented by (x,y)∈[0,$x_{fo}$−l]×[−w,w], the safe zone in the left lane can be represented by (x,y)∈[0,1.5(DTC)−5]×[w,3w], and the safe zone in the right lane can be represented by (x,y)∈[0,1.5(DTC)−5]×[−w,−3w], where DTC represents the DTC value. [1.5(DTC)−5] is a predefined distance in units of meter in this embodiment, and the constants therein may vary in other embodiments.

In sub-step 265, the computer device 14 acquires a DTH (distance to host vehicle) value at the current time point based on the vehicle location and the obstacle location of the rear obstacle at the current time point. The DTH value indicates a distance between the host vehicle and the rear obstacle.

In sub-step 266, the computer device 14 acquires at least one safe zone in front of the host vehicle based on the DTC value of the front obstacle, the obstacle velocity of the rear obstacle, the DTH value, and the vehicle velocity that correspond to the current time point, and on the lane width of the current lane.

Figure 5:
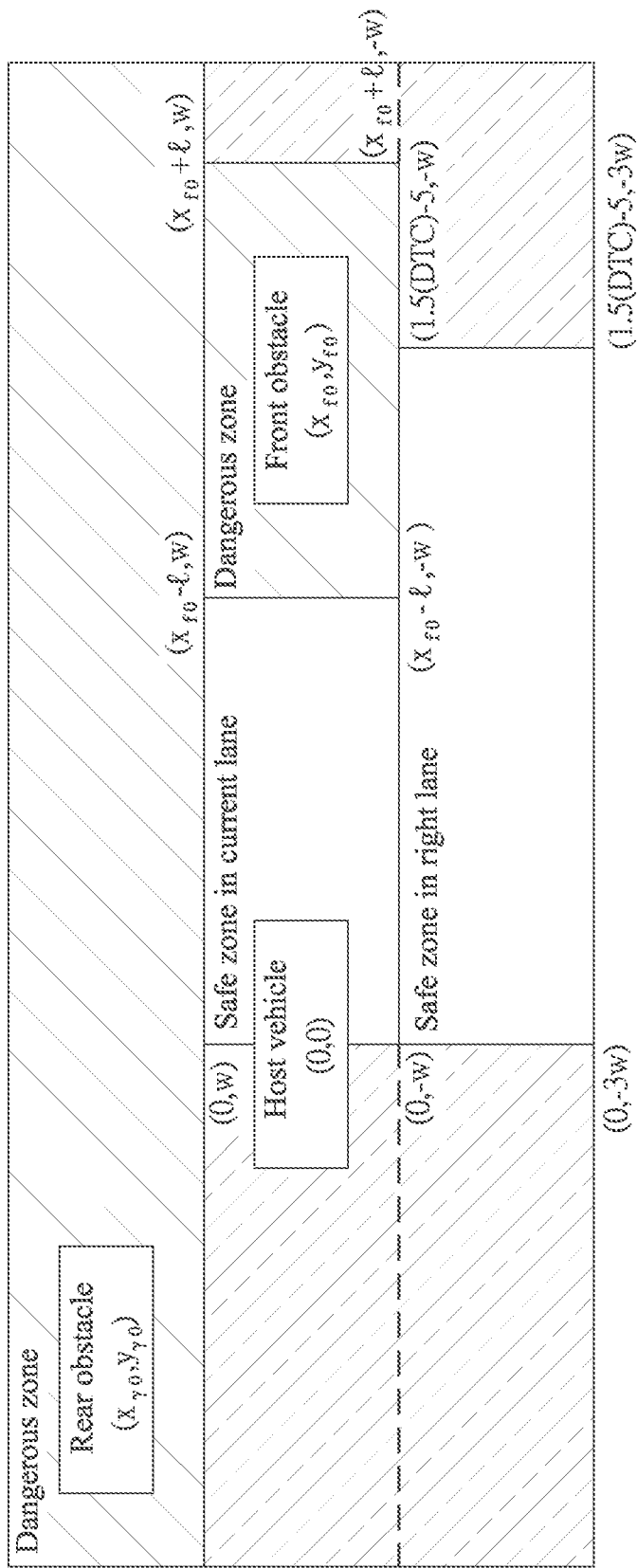
FIG. 5 is a schematic diagram illustrating safety zones acquired using the embodiment when there is a rear obstacle.

In this sub-step, the computer device 14 first acquires a front dangerous zone in which the front obstacle is located, based on the obstacle location of the front obstacle, the vehicle location and the vehicle velocity that correspond to the current time point, and on the lane width of the current lane. Then, the computer device 14 acquires a safe zone in the current lane based on the front dangerous zone, and determines whether a third predetermined condition related to the obstacle location of the rear obstacle is satisfied. In this embodiment, the third predetermined condition is exemplified as:

$$\frac{DTH}{v_{ro}} < \frac{L}{V_{min}} + t_{min},$$

where DTH represents the DTH value, $v_{ro}$ represents the obstacle velocity of the rear obstacle at the current time point, L is the predefined distance that is smaller than or equal to $L_{max}$ and that is defined by L=a×DTC−b, a is a first user-defined constant (which is 1.5 in this embodiment), b is a second user-defined constant (which is 5 meters in this embodiment), DTC represents the DTC value, $t_{min}$ is defined by $t_{min}$=$d_{safe}$/$v_{ro}$, $d_{safe}$ represents a predetermined safe distance, $V_{min}$ is defined by $V_{min}=\sqrt{v_{host}^2 - 2 \cdot a_{last} \cdot L}$, $v_{host}$ represents the vehicle velocity at the current time point, $a_{last}$ is defined by |$a_v$−c×g|, $a_v$ represents the vehicle acceleration at the current time point, C is a third user-defined constant (which is 0.3 in this embodiment) and g represents the gravity acceleration. In one embodiment, the predetermined safe distance $d_{safe}$ may be obtained based on the obstacle velocity $v_{ro}$ of the rear obstacle. For example, when $v_{ro}$=80 km/hr, the predetermined safe distance $d_{safe}$ may be acquired as 80/2=40 meters. The computer device 14 determines the adjacent lane in which the rear obstacle is located as a dangerous zone when the third predetermined condition is satisfied, and acquires a safe zone in the adjacent lane in which the rear obstacle is located when otherwise. FIG. 5 exemplifies a condition where a center of the host vehicle is at (0, 0), a center of the front obstacle is at ($x_{fo}$,$y_{fo}$), a center of the rear obstacle is at ($x_{ro}$,$y_{ro}$), and the dangerous zone in the current lane is a rectangular zone having a length of 2l and a width of 2w, where l represent a length of the front obstacle in the front-back direction, and 2w is the lane width of the current lane. When the computer device 14 determines that the third predetermined condition is satisfied for the rear obstacle, the safe zone in the left lane can be represented by (x,y)∈ϕ because the left lane is determined to be a dangerous zone, the safe zone in the current lane can be represented by (x,y)∈[0,$x_{fo}$−l]×[−w,w], and the safe zone in the right lane can be represented by (x,y)∈[0,1.5(DTC)−5]×[−w,−3w], where DTC represents the DTC value. [1.5(DTC)−5] is a predefined distance in units of meter in this embodiment, and the constants therein may vary in other embodiments.

In sub-step 267, the computer device 14 determines a target safe zone by selecting one zone from among the safe zones acquired in sub-step 264 or among the at least one safe zone acquired in sub-step 266 based on the TTC value, the RTTC value, the DTC value and the DTB value that correspond to the current time point.

In sub-step 268, the computer device 14 acquires a trajectory end positioned within the target safe zone.

In sub-step 269, the computer device 14 updates the current trajectory based on the trajectory end acquired in sub-step 262 or sub-step 268, the heading angle at the current time point, the vehicle velocity at the current time point, the vehicle location at the current time point, the lane width of the current lane, and the obstacle location, the obstacle velocity and the obstacle acceleration of each obstacle detected by the obstacle sensor device 12 at the current time point. Reference may be made to "Xu, W., Wei, J., Dolan, J. M., Zhao, H., & Zha, H. (2012). A real-time motion planner with trajectory optimization for autonomous vehicles. 2012 *IEEE International Conference on Robotics and Automation*, 2061-2067." for details of sub-step 269, which are thus omitted herein for the sake of brevity.

In summary, the method and system of adaptive trajectory generation updates the current trajectory when the first predetermined condition is not satisfied while the second predetermined condition is satisfied, so as to make the host vehicle dodge the obstacle when changes in the road condition impose safety concerns. The computer device 14 further timely updates the current trajectory when a distance between an end of the current trajectory and the vehicle location at the current time point is smaller than a threshold.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of adaptive trajectory generation for a host vehicle that includes:
   a vehicle sensor device configured to continuously detect vehicle dynamic parameters of the host vehicle, so as to generate vehicle information that relates to the host vehicle and that includes a vehicle velocity and a vehicle acceleration, wherein the vehicle velocity refers to a velocity of the host vehicle, and the vehicle acceleration refers to an acceleration of the host vehicle;
   an obstacle sensor device configured to continuously perform obstacle detection within a predetermined distance of the host vehicle, so as to generate, for each obstacle thus detected, an obstacle information piece corresponding to the obstacle, the obstacle information piece including:
      an obstacle location that refers to a location of the obstacle;
      an obstacle velocity that refers to a velocity of the obstacle; and
      an obstacle acceleration that refers to an acceleration of the obstacle;
   a navigation device storing a map that relates to a route on which the host vehicle is traveling, and configured to continuously determine a vehicle location which refers to a location of the host vehicle, and to generate road condition information that includes a maximum speed limit and a lane width of a current lane, which is a lane in which the host vehicle is currently located, wherein the map includes information of each lane of each road;
   a traffic flow sensor device configured to detect velocities of vehicles in an adjacent lane that is a lane next to the current lane and that has a same lane direction as the current lane; and
   a computer device coupled to the vehicle sensor device, the obstacle sensor device, the navigation device and the traffic flow sensor device, and storing a current trajectory for the host vehicle;
   said method being implemented by the computer device, and comprising, for a detected obstacle, which is an obstacle detected by the obstacle sensor device within the predetermined distance of the host vehicle:
   A) determining whether a first predetermined condition is satisfied at a current time point, wherein the first predetermined condition is related to the vehicle information, the vehicle location and the obstacle information piece generated for the detected obstacle;
   B) upon determining that the first predetermined condition is not satisfied, determining whether a second predetermined condition is satisfied at the current time point, wherein the second predetermined condition is related to the vehicle information, the vehicle location, the obstacle information piece generated for the detected obstacle, the road condition information and the velocities of vehicles in the adjacent lane; and
   C) upon determining that the second predetermined condition is satisfied, updating the current trajectory based on the vehicle information, the vehicle location, the obstacle information piece generated for the detected obstacle and the road condition information that correspond to the current time point.

2. The method of claim 1, the detected obstacle being a front obstacle that is in front of the host vehicle in the current lane, and the obstacle information piece corresponding to the front obstacle further including a front distance of the front obstacle relative to the host vehicle, a forward velocity of the front obstacle relative to the host vehicle, and a forward acceleration of the front obstacle relative to the host vehicle, said method further comprising, prior to step A):
   D) acquiring a TTC value for the front obstacle at the current time point based on the front distance, the forward velocity and the forward acceleration at the current time point;
      acquiring an RTTC value for the front obstacle at the current time point based on the TTC value acquired for the current time point and a TTC value acquired for a last time point;
      acquiring a DTC value for the front obstacle at the current time point based on the vehicle location and the obstacle location at the current time point;
      acquiring a DTB value for the front obstacle at the current time port based on the vehicle velocity and the obstacle velocity at the current time point; and
      acquiring a TTB value for the front obstacle at the current time point based on the vehicle velocity at the current time point;
      wherein the TTC value indicates a length of time after which the host vehicle will collide with the front obstacle; the RTTC value indicates a rate of change in the TTC value; the DTC value indicates a distance between the host vehicle and the front obstacle; the DTB value is a threshold value that indicates a distance required for a safe stop of the host vehicle if the computer device decides to brake; and the TTB value indicates a length of time required or a safe stop of the host vehicle from a beginning of braking of the host vehicle;
   wherein, in step A), the computer device determines whether the first predetermined condition is satisfied based on the TTC value, the RTTC value, the DTC value, the DTB value and the TTB value for the front obstacle at the current time point.

3. The method of claim 2, wherein the first predetermined condition includes that the DTC value is smaller than or equal to the DTB value, that the TTC value is smaller than or equal to the TTB value, and that the RTTC value is smaller than zero.

4. The method of claim 2, the vehicle information further including a heading angle of the host vehicle, wherein, in step C), the computer device updates the current trajectory further based on the DTC value, the TTC value, the RTTC value and the DTB value for the front obstacle at the current time point, and step C) includes:
   C-1) determining, based on the obstacle location, whether the obstacle is in front of the host vehicle;
   C-2) upon determining that the obstacle is in front of the host vehicle, determining whether there is a rear obstacle at the current time point, wherein the rear obstacle is an obstacle that is detected by the obstacle sensor device and that is behind the host vehicle in the adjacent lane;
   C-3) upon determining that there is a rear obstacle, acquiring a DTH value based on the vehicle location and the obstacle location of the rear obstacle at the current time point, wherein the DTH value indicates a distance between the host vehicle and the rear obstacle;
   C-4) acquiring at least one safe zone in front of the host vehicle based on the DTC value, the obstacle velocity of the rear obstacle, the DTH value, and the vehicle velocity that correspond to the current time point, and based on the lane width of the current lane;

C-5) selecting a target safe zone from among the at least one safe zone based on the TTC value, the RTTC value, the DTC value and the DTB value for the front obstacle at the current time point;

C-6) acquiring a trajectory end positioned within the target safe zone; and

C-7) updating the current trajectory based on the trajectory end, the heading angle, the vehicle velocity, the vehicle location, the lane width of the current lane, and the obstacle location, the obstacle velocity and the obstacle acceleration of each obstacle detected by the obstacle sensor device.

5. The method of claim 4, wherein sub-step C-4) includes:

acquiring a dangerous zone in which the front obstacle is located, based on the obstacle location of the front obstacle, the vehicle location and the vehicle velocity at the current time point, and the lane width of the current lane;

acquiring a safe zone in the current lane based on the dangerous zone;

determining whether a third predetermined condition is satisfied, wherein the third predetermined condition is related to the obstacle location of the rear obstacle; and upon determining that the third predetermined condition is not satisfied, acquiring a safe zone in the adjacent lane.

6. The method of claim 5, wherein the third predetermined condition is $$\frac{DTH}{v_{ro}} < \frac{L}{V_{min}} + t_{min},$$

where DTH represents the DTH value, $v_{ro}$ represents the obstacle velocity of the rear obstacle at the current time point, L is a distance defined by $L = a \times DTC - b$, a is a first user-defined constant, b is a second user-defined constant, DTC represents the DTC value, the predetermined distance is greater than or equal to L, $t_{min}$ is defined by $t_{min} = d_{safe}/v_{ro}$, $d_{safe}$ represents a predetermined safe distance, $V_{min}$ is defined by $V_{min} = \sqrt{v_{host}^2 - 2 \cdot a_{last} \cdot L}$, $v_{host}$ represents the vehicle velocity at the current time point, $a_{last}$ is defined by $|a_v - c \times g|$, $a_v$ represents the vehicle acceleration at the current time point, C is a third user-defined constant, and g represents a gravity acceleration.

7. The method of claim 2, wherein the second predetermined condition includes that the maximum speed limit is greater than the vehicle velocity at the current time point by a first predetermined value, that a traffic flow of the vehicles in the adjacent lane is smaller than the maximum speed limit by a second predetermined value, and that the RTTC value is smaller than zero.

8. The method of claim 1, further comprising:

determining whether a distance between the vehicle location and an end of the current trajectory at the current time point is smaller than a threshold; and upon determining that the distance between the vehicle location and the end of the current trajectory at the current time point is smaller than the threshold, updating the current trajectory based on the vehicle information, the vehicle location, the obstacle information piece generated for the detected obstacle, and the road condition information that correspond to the current time point.

9. A system of adaptive trajectory generation for a host vehicle comprising:

a vehicle sensor device configured to continuously detect vehicle dynamic parameters of the host vehicle so as to generate vehicle information that relates to the host vehicle and that includes a vehicle velocity and a vehicle acceleration, wherein the vehicle velocity refers to a velocity of the host vehicle, and the vehicle acceleration refers to an acceleration of the host vehicle;

an obstacle sensor device configured to continuously perform obstacle detection within a predetermined distance of the host vehicle, and to generate, for each obstacle thus detected, an obstacle information piece corresponding to the obstacle, the obstacle information piece including:

an obstacle location that refers to a location of the obstacle;

an obstacle velocity that refers to a velocity of the obstacle; and an obstacle acceleration that refers to an acceleration of the obstacle;

a navigation device storing a map that relates to a route on which the host vehicle is traveling, and configured to continuously determine a vehicle location which refers to a location of the host vehicle, and to generate road condition information that includes a maximum speed limit and a lane width of a current lane, which is a lane in which the host vehicle is currently located, wherein the map includes information of each lane of each road;

a traffic flow sensor device configured to detect velocities of vehicles in an adjacent lane that is a lane next to the current lane and that has a same lane direction as the current lane; and a computer device coupled to said vehicle sensor device, said obstacle sensor device, said navigation device and said traffic flow sensor device, and scoring a current trajectory for the host vehicle;

wherein said computer device is configured to, for a detected obstacle, which is an obstacle detected by said obstacle sensor device within the predetermined distance of the host vehicle, determine whether a first predetermined condition is satisfied at a current time point, wherein the first predetermined condition is related to the vehicle information, the vehicle location and the obstacle information piece generated for the detected obstacle;

wherein said computer device is configured to, upon determining that the first predetermined condition is not satisfied, determine whether a second predetermined condition is satisfied at the current time point, wherein the second predetermined condition is related to the vehicle information, the vehicle location, the obstacle information piece generated for the detected obstacle, the road condition information and the velocities of vehicles in the adjacent lane; and wherein said computer device is configured to, upon determining that the second predetermined condition is satisfied, update the current trajectory based on the vehicle information, the vehicle location, the obstacle information piece generated for the detected obstacle, and the road condition information that correspond to the current time point.

10. The system of claim 9, said the detected obstacle being a front obstacle that is in front of the host vehicle in the current lane, and the obstacle information piece that corresponds to the front obstacle further including a front distance of the front obstacle relative to the host vehicle, a forward velocity of the front obstacle relative to the host vehicle, and a forward acceleration of the front obstacle relative to the host vehicle,
  wherein said computer device is configured to acquire a TTC value for the front obstacle at the current time point based on the front distance, the forward velocity and the forward acceleration, the TTC value indicating a length of time after which the host vehicle will collide with the front obstacle;
  wherein said computer device is configured to acquire an RTTC value for the front obstacle at the current time point based on the TTC value acquired for the current time point and a TTC value acquired for a last time point, the RTTC value indicating a rate of change in the TTC value;
  wherein said computer device is configured to acquire a DTC value for the front obstacle at the current time point based on the vehicle location and the obstacle location at the current time point, the DTC value indicating a distance between the host vehicle and the front obstacle;
  wherein said computer device is configured to acquire a DTB value for the front obstacle at the current time point based on the vehicle velocity and the obstacle velocity at the current time point, the DTB value being a threshold value that indicates a distance required for a safe stop of the host vehicle if the computer device decides to brake;
  wherein said computer device is configured to acquire a TTB value for the front obstacle based on the vehicle velocity, the TTB value indicating a length of time required for a safe stop of the host vehicle from a beginning of braking of the host vehicle; and
  wherein said computer device determines whether the first predetermined condition is satisfied based on the TTC value, the RTTC value, the DTC value, the DTB value and the TTB value for the front obstacle at the current time point.

11. The system of claim 10, wherein the first predetermined condition includes that the DTC value is smaller than or equal to the DTB value, that the TTC value is smaller than or equal to the TTB value, and that the RTTC value is smaller than zero.

12. The system of claim 10, the vehicle information further including a heading angle of the host vehicle, wherein said computer device updates the current trajectory further based on the DTC value, the TTC value the RTTC value and the DTB value for the front obstacle at the current time point;
  wherein said computer device is configured to determine whether an obstacle is in front of the host vehicle based on the obstacle location corresponding thereto;
  wherein said computer device is configured to, upon determining that the obstacle is in front of the host vehicle, determine whether there is a rear obstacle at the current time point, wherein a rear obstacle is an obstacle that is detected by said obstacle sensor device and that is behind the host vehicle in the adjacent lane;
  wherein said computer device is configured to, upon determining that there is a rear obstacle, acquire a DTH value based on the vehicle location and the obstacle location of the rear obstacle at the current time point, wherein the DTH value indicates a distance between the host vehicle and the rear obstacle;
  wherein said computer device is configured to acquire at least one safe zone in front of the host vehicle based on the DTC value, the obstacle velocity of the rear obstacle, the DTH value, and the vehicle velocity that correspond to the current time point, and the lane width of the current lane;
  wherein said computer device is configured to select a target safe zone from among the at least one safe zone based on the TTC value, the RTTC value, the DTC value and the DTB value for the front obstacle at the current time point;
  wherein said computer device is configured to acquire a trajectory end positioned within the target safe zone; and
  wherein said computer device is configured to update the current trajectory based on the trajectory end, the heading angle, the vehicle velocity, the vehicle location, the lane width of the current lane, and the obstacle location, the obstacle velocity and the obstacle acceleration of each obstacle detected by said obstacle sensor device.

13. The system of claim 12, wherein said computer device is configured to acquire dangerous zone in which the front obstacle is located, based on the obstacle location of the front obstacle and the vehicle velocity at the current time point, and the lane width of the current lane;
  wherein said computer device is configured to acquire a safe zone in the current lane based on the dangerous zone;
  wherein said computer device is configured to determine whether a third predetermined condition is satisfied, wherein the third predetermined condition is related to the obstacle location of the rear obstacle; and
  wherein said computer device is configured to, upon determining that the third predetermined condition is not satisfied, acquire a safe zone in the adjacent lane.

14. The system of claim 13, wherein the third predetermined condition is $$\frac{DTH}{v_{ro}} < \frac{L}{V_{min}} + t_{min},$$

where DTH represents the DTH value, $v_{ro}$ represents the obstacle velocity of the rear obstacle at the current time point, L is a distance defined by $L = a \times DTC - b$, a is a first user-defined constant, b is a second user-defined constant, DTC represents the DTC value, the predetermined distance is greater than or equal to L, $t_{min}$ is defined by $t_{min} = d_{safe}/v_{ro}$, $d_{safe}$ represents a predetermined safe distance, $V_{min}$ is defined by $V_{min} = \sqrt{v_{host}^2 - 2 \cdot a_{last} \cdot L}$, $v_{host}$ represents the vehicle velocity at the current time point, $a_{last}$ is defined by $|a_v - c \times g|$, $a_v$ represents the vehicle acceleration at the current time point, c is a third user-defined constant, and g represents a gravity acceleration.

15. The system of claim 10, wherein the second predetermined condition includes that the maximum speed limit is greater than the vehicle velocity at the current time point by a first predetermined value, that a traffic flow of the vehicles in the adjacent lane is smaller than the maximum speed limit by a second predetermined value, and that the RTTC value is smaller than zero.

16. The system of claim 9, wherein said computer device is configured to determine whether a distance between the vehicle location and an end of the current trajectory at the current time point is smaller than a threshold; and
wherein said computer device is configured to, upon determining that the distance between the vehicle location and the end of the current trajectory at the current time point is smaller than the threshold, update the current trajectory based on the vehicle information, the vehicle location, the obstacle information piece and the road condition information that correspond to the current time point.

* * * * *